United States Patent [19]

Shimozawa

[11] Patent Number: 5,237,549
[45] Date of Patent: Aug. 17, 1993

[54] MAGNETO-OPTICAL DISK STORAGE DEVICE HAVING OPTICAL HEAD APPLICABLE TO DIFFERENT TYPES OF MAGNETO-OPTICAL DISKS

[75] Inventor: Kenji Shimozawa, Mitaka, Japan
[73] Assignee: TEAC Corporation, Japan
[21] Appl. No.: 733,140
[22] Filed: Jul. 19, 1991

[30] Foreign Application Priority Data

Jul. 23, 1990 [JP] Japan .............................. 2-78090[U]

[51] Int. Cl.⁵ .............................................. G11B 7/09
[52] U.S. Cl. .............................. 369/44.17; 369/44.25; 369/110
[58] Field of Search ...................... 369/110, 112, 44.17, 369/44.25, 44.14

[56] References Cited

U.S. PATENT DOCUMENTS

| 4,573,149 | 2/1986 | Deguchi et al. | 369/44.39 |
| 4,672,593 | 6/1987 | Ojima et al. | 369/112 |
| 4,721,368 | 1/1988 | Deguchi et al. | 369/110 |
| 5,070,494 | 12/1991 | Emoto et al. | 369/112 |

*Primary Examiner*—Donald E. McElheny, Jr.
*Attorney, Agent, or Firm*—Andrus, Sceales, Starke & Sawall

[57] ABSTRACT

In an optical head in a magneto-optical disk storage, an angle of a polarized light surface of a laser beam can be adjusted so that the strength of a tracking error signal can be maximized. Therefore, the optical head and the magneto-optical disk storage having the optical head is applicable to both p-polarized light type and s-polarized light type magneto-optical disks. Hereupon, the laser beam corresponding to the p-polarized light type magneto-optical disk transmits parallel to the grooves on the magneto-optical disk. On the other hand, the laser beam corresponding to the s-polarized light type magneto-optical disk transmits vertical to the grooves on the magneto-optical disk. Thus, according to the present invention, just one optical head can handle both types of magneto-optical disks.

6 Claims, 4 Drawing Sheets

MAGNETO-OPTICAL DISK STORAGE DEVICE HAVING OPTICAL HEAD APPLICABLE TO DIFFERENT TYPES OF MAGNETO-OPTICAL DISKS

BACKGROUND OF THE INVENTION

The present invention relates generally to an optical head applicable to different types of magneto-optical disks, and a magneto-optical disk storage having such an optical head.

The conventional magneto-optical disk storage has an optical head corresponding to each type of magneto-optical disk. That is, different optical heads are used for respective p-polarized and s-polarized light types of magneto-optical disks. If the optical head does not correspond to the type of the magneto-optical disk, a desired reproducing operation cannot be performed due to the low output level of a tracking error signal. Hereupon, a laser beam of the optical head corresponding to the p-polarized light type of magneto-optical disk transmits parallel to the grooves thereon. On the other hand, a laser beam of the optical head corresponding to the s-polarized light type of magneto-optical disk transmits vertical to the grooves thereon.

However, it is troublesome to prepare a different optical head for each type of magneto-optical disk.

SUMMARY OF THE INVENTION

Accordingly, it is a general object of the present invention to provide a novel and useful optical head and a magneto-optical disk storage having such an optical head in which the above disadvantage is eliminated.

Another object of the present invention is to provide an optical head and a magneto-optical disk storage having such an optical head which are applicable to different types of magneto-optical disks.

According to one feature of the present invention, an optical head comprises laser means for radiating a laser beam, including polarizing means polarizing the laser beam, said laser means irradiating the laser beam with a predetermined angle of a polarized light surface on a desired groove on a magneto-optical disk with a plurality of grooves thereon, first detecting means for detecting a Kerr rotating angle of the laser beam at the desired groove, reproducing means for reproducing information recorded on the magneto-optical disk based on the Kerr rotating angle detected by the first detecting means, second detecting means for detecting a reflecting beam of the laser beam as a tracking error signal at the magneto-optical disk in order to transmit the laser beam on the desired groove, and angle changing means, coupled to the second detecting means, for changing the angle of the polarized light surface of the laser beam by controlling said polarizing means so that the strength of the tracking error signal detected by the second detecting means can be maximized.

According to another feature of the present invention, a magneto-optical disk storage comprises an optical head which comprises laser means for radiating a laser beam, including polarizing means polarizing the laser beam, said laser means irradiating the laser beam with a predetermined angle of a polarized light surface on a desired groove on a magneto-optical disk with a plurality of grooves thereon, first detecting means for detecting a Kerr rotating angle of the laser beam at the desired groove, reproducing means for reproducing information recorded on the magneto-optical disk based on the Kerr rotating angle detected by the first detecting means, second detecting means for detecting a reflecting beam of the laser beam as a tracking error signal at the magneto-optical disk in order to transmit the laser beam on the desired groove, and angle changing means, coupled to the second detecting means, for changing the angle of the polarized light surface of the laser beam by controlling said polarizing means so that the strength of the tracking error signal detected by the second detecting means can be maximized, driving means for driving the optical head, and control means for controlling the operating of the optical head.

According to the present invention, since the angle changing means changes the angle of the polarized light surface of the laser beam, the optical head can be applied to both p-polarized light type and s-polarized light type of magneto-optical disk storages.

Other objects and further features of the present invention will become apparent from the following detailed description when read in conjunction with the accompanying drawings.

DESCRIPTION OF THE PREFERRED EMBODIMENTS

Figure 1A:
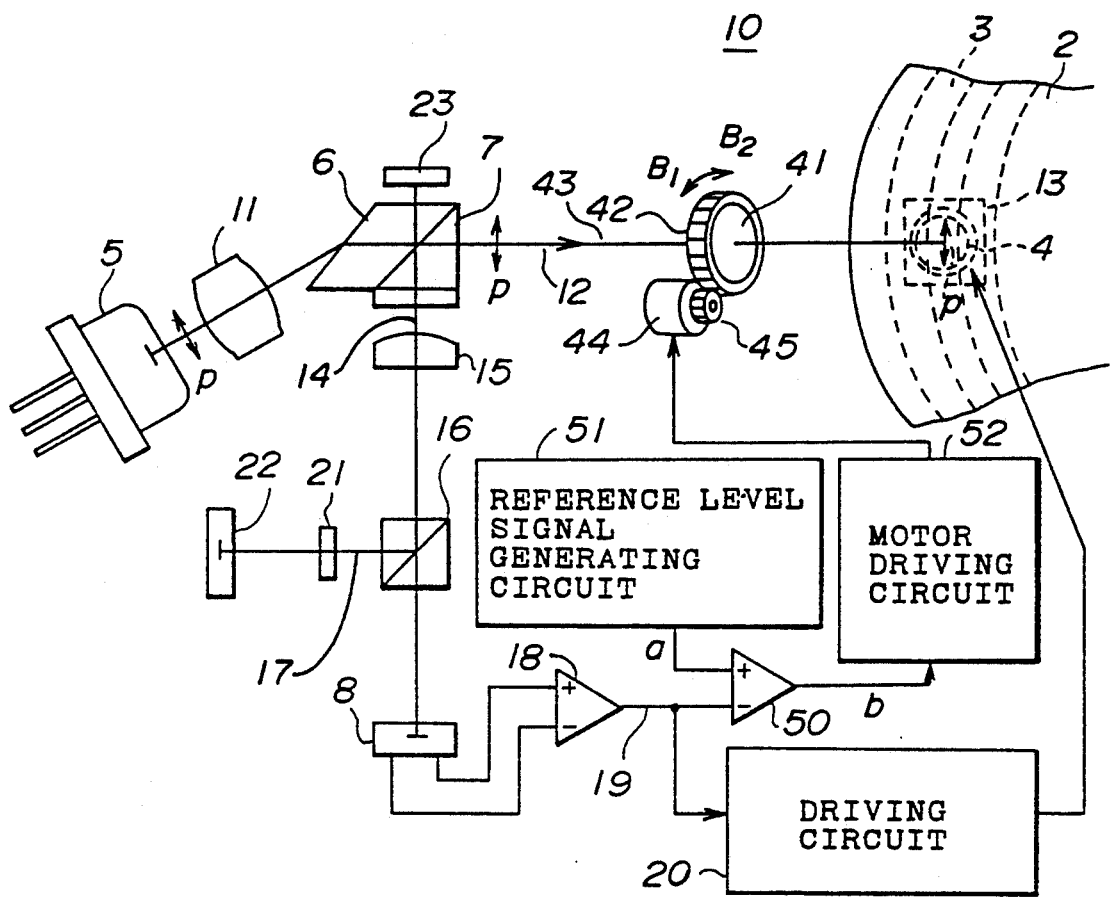
FIG. 1A shows a plane view of an magneto-optical disk storage of a first embodiment according to the present invention.
Figure 1B:
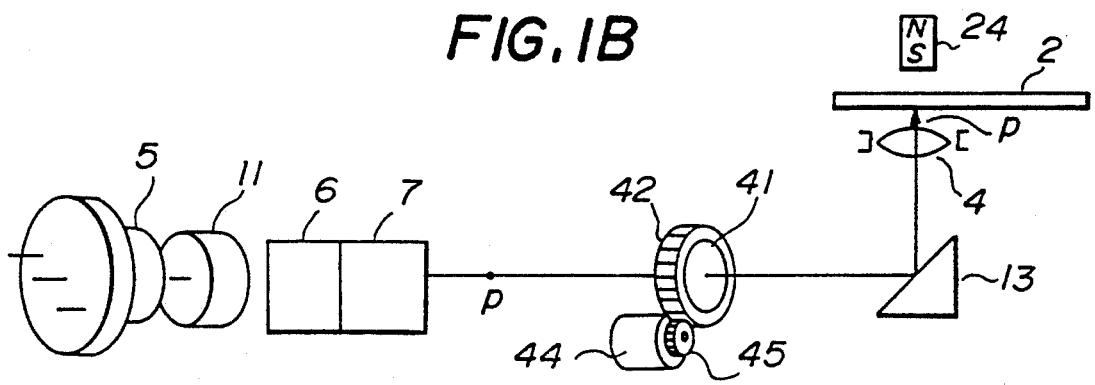
FIG. 1B is a view showing an optical path 43 shown in FIG. 1A.

The magneto-optical disk storage 10 of the first embodiment according to the present invention comprises, as shown in FIGS. 1A and 1B, an objective lens 4, a semiconductor laser 5, a beam formation prism 6, a beam splitter 7, a light detector for detecting a tracking signal 8, a collimator lens 11, a reflecting prism 13, a convex lens 15, a polarized beam splitter 16, a differential amplifier 18, a driving circuit 20, a cylindrical lens 21, a light detector for detecting a focus error signal 22, a monitoring detector 23, a permanent magnet 24, a ½ wavelength plate 41, a cylindrical gear 42, a stepping motor 44, a gear 45, a comparator 50, a reference level signal generating circuit 51 and a motor driving circuit 52.

The semiconductor laser 5, collimator lens 11, beam formation prism 6, beam splitter 7, ½ wavelength plate 41, reflecting prism 13 and objective lens 4 are aligned on an optical path 43. On the other hand, the convex lens 15 and the polarized beam splitter 16 are aligned on the optical path generated by the beam splitter 7, the cylindrical lens 21 and the light detectors 8 and 22 are aligned on the optical path generated by the beam splitter 16. The beam formation prism 6 is engaged with the beam splitter 7. The ½ wave length plate 41 is fixed inside the cylindrical gear 42. The gear 45 is engaged with the stepping motor 44 and the cylindrical gear 42. The light detector 8 is connected to input terminals of the differential amplifier 18. The minus terminal of the comparator 50 is connected to the output of the differential amplifier 18, and the plus terminal thereof is connected to the output terminal of the reference level signal generating circuit 51. The output of the comparator 50 is inputted to the driving circuit 52. The output terminal of the differential amplifier 18 is connected to the input terminal of the driving circuit 20. The driving circuit 20 is connected to the objective lens 4.

The objective lens 4 is opposite to the lower surface of the magneto-optical disk 2. The magneto-optical disk 2 has a plurality of grooves in a circumferential direction thereof, and is rotated at a high speed. The magneto-optical disk 2 used for the embodiments of this invention is of a p-polarized light type or s-polarized light type. The ellipse-shaped laser beam 10 outputted from the semiconductor laser 5 has a p-polarized light surface in a minor axis and a s-polarized light surface in an apse axis. The beam formation prism 6 forms the laser beam 10. After the laser beam 10 penetrates through the beam splitter 7, it becomes a laser beam 12. The monitoring detector 23 monitors the output of the laser beam 10 of the semiconductor laser 5. In this embodiment, a vibration direction of the p-polarized light of the laser beam 12 initially coincides with the direction of the grooves 3 (circumferential direction) of the magneto-optical disk 2.

Figure 2A:
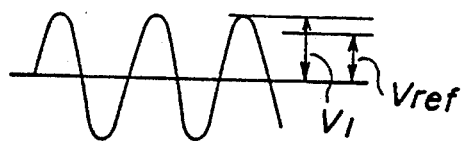
FIG. 2A shows a waveform view of a tracking error signal generated in a case where an optical head corresponding to a magneto-optical disk reproduces information thereon.
Figure 2B:
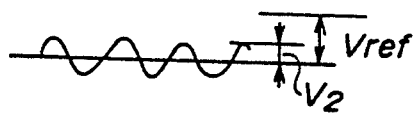
FIG. 2B shows a waveform view of a tracking error signal generated in a case where an optical head which does not correspond to a magneto-optical disk reproduces the information thereon.

The light detector 8 comprises a photo diode and detects the tracking error signal. Incidentally, the tracking error signal has the known reference level. If the optical head which does not correspond to the type of the magneto-optical disk 2 detects the tracking signal by means of the push-pull method, the output level of the tracking error signal becomes approximately one-third as large as that detected by the optical head which corresponds to the type of the magneto-optical disk. That is, the output level of the tracking error signal detected by the optical head which corresponds to the type of the magneto-optical disk is indicated as shown in FIG. 2A, and the output level of the tracking error signal detected by the optical head which does not correspond to the type of the magneto-optical disk is indicated as shown in FIG. 2B. The light detector 22 detects the focus error signal. Because of the light detectors 8 and 22, information recorded on the magneto-optical disk can be reproduced. The driving circuit 20 corrects the tracking error based on the output from the differential amplifier 18 by driving the objective lens 4 in the direction vertical to the grooves 3.

The ½ wavelength plate 41 rotates the polarized light surface of the incident light by 45 . The ½ wavelength plate 41 is located so that the signal detection sensitivity can be maximized, and in addition, the penetrating light and reflecting light through the beam splitter 16 can be made equal to each other to remove noises generated by the changing of the reflection ratio of the disk 2. The ½ wavelength plate 41 can be provided pivotally in the directions $B_1$ and $B_2$ between a first rotating position $Q_1$ and a second rotating position $Q_2$. When the ½ wavelength plate 41 is located at the first rotating position $Q_1$, its optical axis 46 coincides with the X-axis, and when it is located at the second rotating position $Q_2$, its optical axis 46 is inclined toward the X-axis by 45°. The direction of the X-axis coincides with the vibration direction of the laser beam 12. The ½ wavelength plate 41 is initially located at the first rotating position $Q_1$, and thus the laser beam 12 penetrates through the ½ wavelength plate 41 without an angle of its polarized light surface being rotated. On the other hand, if the ½ wavelength plate 41 is located at the second rotating position $Q_2$, the angle of the polarized light surface of the laser beam 12 is rotated by 90° after the laser beam 12 is penetrated therethrough.

The comparator 50 compares the output level of the tracking error signal transmitted from the differential amplifier 18 with the reference output level Vref of a signal transmitted from a reference level signal generating circuit 51, and consequently outputs the comparing result signal b to the motor driving circuit 52. Incidentally, the relationships between the output levels $V_1$ and Vref and the output levels $V_2$ and Vref are indicated in FIGS. 2A and 2B. The comparing result signal b becomes a low level when the output level of the tracking error signal is higher than the reference output level Vref, and becomes a high level when the output level of the tracking error signal is lower than the reference output level Vref. The motor driving circuit 52 does not operate when the comparing result signal b is a low level, but operates when the comparing result signal be is a high level and outputs a pulse string signal, by which the ½ wavelength plate 41 is rotated by 45°, to the stepping motor 44.

Next, a description will now be given of the operation of the magneto-optical disk storage 10. First, a magneto-optical disk 2 is experimentally reproduced. The laser beam 10 output from the semiconductor laser 5 is transmitted into the beam formation prism 6 via a collimator lens 11 so as to have a circular section, and output from the beam splitter 7 as a laser beam 12 to the objective lens 4. The laser beam 12 is reflected by the reflecting prism 13 and focused on the magneto-optical disk 2 by the objective lens 4. The polarized light surface of the laser beam 12 is rotated 14 by a magnetic Kerr effect, so that the laser beam 12 becomes a reflected laser beam 14. The laser beam 14 comprises a magneto-optical signal and a servosignal including a focus error signal and a tracking error signal. The laser beam 14 is reflected by the reflecting prism 13 via the objective lens 4 and directed to the beam splitter 7. The laser beam 14 is partially reflected by the beam splitter 7 and divided into two directions by the polarized light beam splitter 16 through the convex lens 15. A part of laser beam 17 through the polarized light beam splitter 16 is transmitted into the light detector 22 via the cylindrical lens 21 and the rest thereof is transmitted into the light detector 8.

Figure 3:
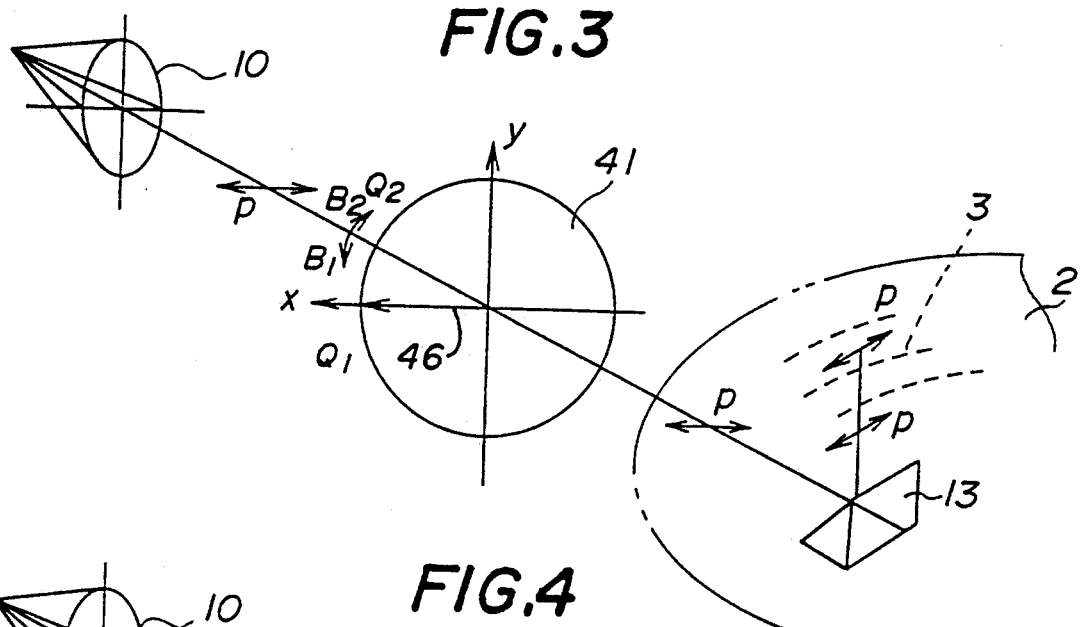
FIG. 3 shows a ½ wavelength plate located at a first rotating position $Q_1$.

The output from the light detector 8 is supplied to the differential amplifier 18 and is supplied as a tracking error signal 19 to the driving circuit 20. If the disk is the p-polarized light type, the output level $V_1$ of the tracking error signal 19 becomes higher than the reference output level Vref, so that the comparison result signal b becomes a low level and the circuit 52 does not operate. Since the motor 44 is not driven, the ½ wavelength plate 41 is kept be located at the first rotating position $Q_1$. After the experimental reproducing of the magneto-optical disk 2, information recorded on the magneto-optical disk 2 is reproduced without changing an angle of the polarized light surface of the laser beam 12, as shown in FIG. 3.

Figure 4:
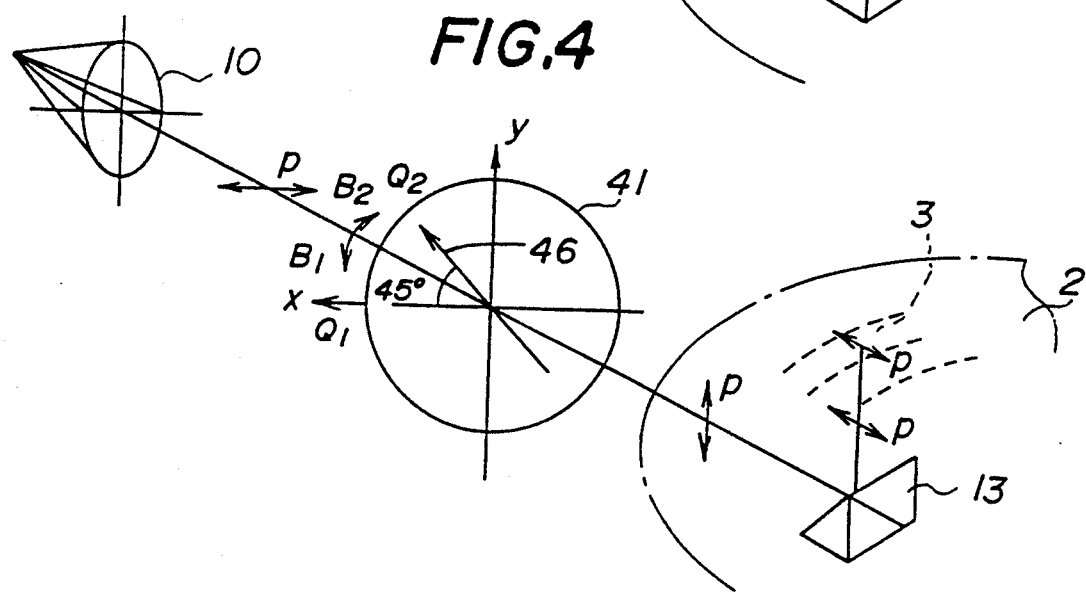
FIG. 4 shows a ½ wavelength plate located at a second rotating position $Q_2$.

However, if the magneto-optical disk 2 is the s-polarized light type, the output level $V_2$ of the tracking error signal 19 is lower than the reference output level Vref, so that the comparison result signal b becomes a high level and thus the circuit 52 starts to operate. Consequently, the circuit 52 outputs the pulse string signal to the stepping motor 44. Responsive thereto, the stepping motor 44 rotates the ½ wavelength plate 41 by 45° in the direction $B_2$, to the second rotating position $Q_2$, via the cylindrical gear 42. As a result, as shown in FIG. 4, the angle of the polarized light surface of the laser beam 12 is rotated by 90° when the laser beam 12 penetrates through the ½ wavelength plate 41, and the vibration direction of the p-polarized light coincides with the radial direction of the magneto-optical disk 2. Needless to say, the angle of the polarized light surface of the laser beam 14 is also rotated by 90° when the laser beam 14 penetrates through the ½ wavelength plate 41. By rotating the angle of the polarized light surface by 90°, the output level of the tracking error signal changes from $V_2$ to $V_1$ After the experimental reproducing of the magneto-optical disk 2, the information recorded on the disk 2 is reproduced.

Figure 5:
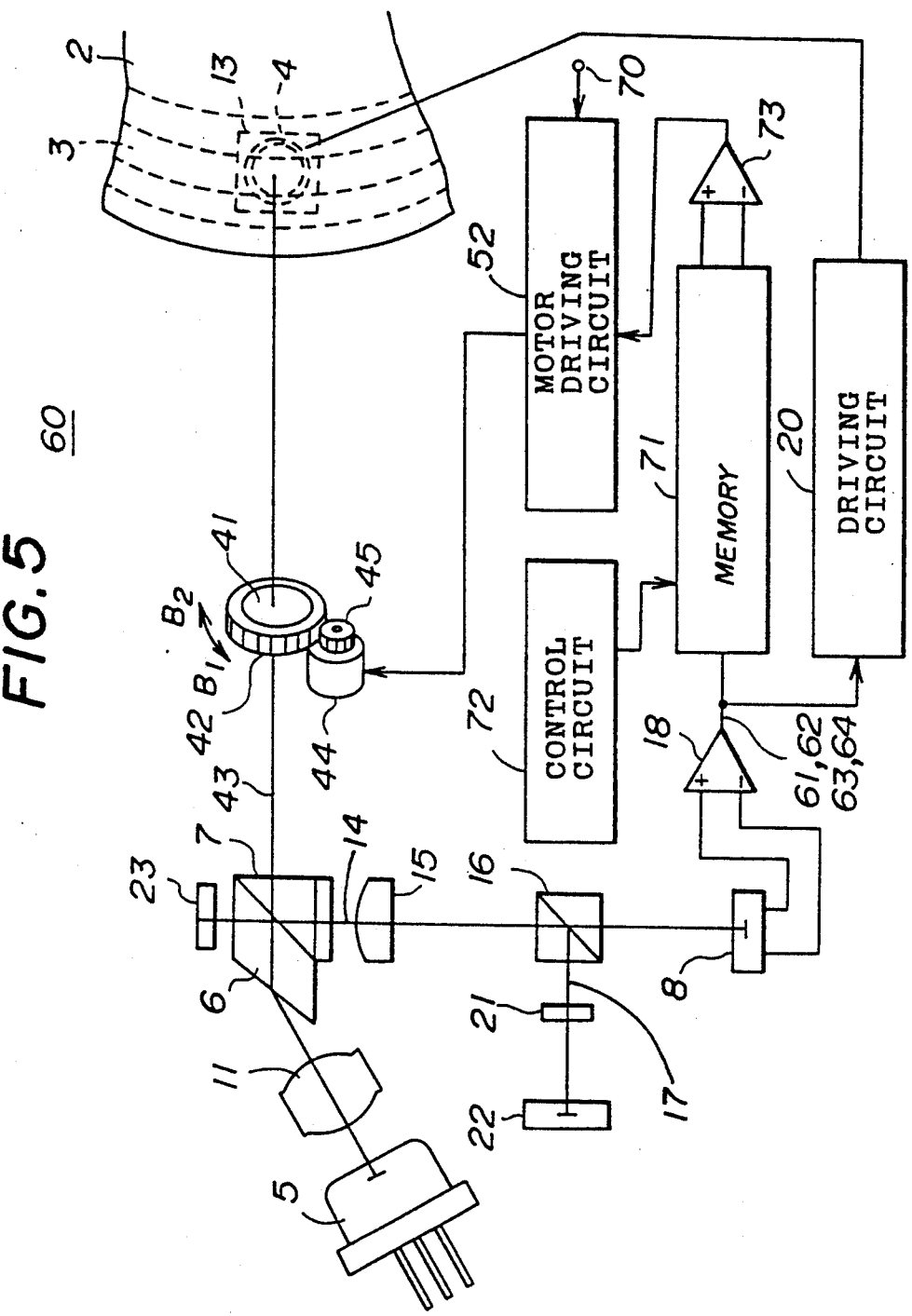
FIG. 5 shows a plane view of a magneto-optical disk storage of a second embodiment according to the present invention.

A description will now be given of the magneto-optical disk storage 60 of the second embodiment according to the present invention with reference to FIG. 5. Incidentally, those elements which are the same as corresponding in FIG. 1 are designated by the same reference numerals, and the description thereof will be omitted. In this embodiment, the comparator 50 and the reference level signal generating circuit 51 in FIG. 1A are respectively substituted by the memory 71, control circuit 72 and the comparator 72. The output of the differential amplifier 18 is inputted into the driving circuit 20 and the memory 71. On the other hand, the output of the control circuit 72 is inputted into the memory 71. The output of the memory 71 is inputted into the comparator 73. The output of the comparator 73 is inputted into the motor driving circuit 52. Incidentally, the experimental reproducing signal 70 is inputted into the motor driving circuit 52 when the disk 2 is experimentally reproduced. The motor driving circuit 52 moves the ½ wavelength plate 41 from the first rotating position $Q_1$ to the second rotating position $Q_2$ a predetermined time later in response to the experimental reproducing signal 70. The memory 71 memorizes the output levels $V_{10}$ and $V_{20}$ of the tracking error signal while the ½ wavelength plate 41 is being located at the first rotating position $Q_1$ and the output levels $V_{11}$ and $V_{21}$ of the tracking error signal while the ½ wavelength plate 41 is being located at the second rotating position $Q_2$. The control circuit 72 controls the operation of the memory 71. The comparator 73 compares the output levels $V_{10}$ and $V_{20}$ with the output levels $V_{11}$ and $V_{21}$.

Figures 6A, 6B:
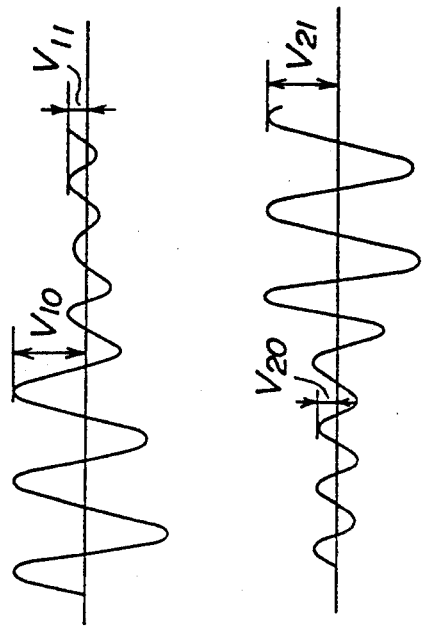
FIG. 6A shows a waveform view representing different output levels of a tracking error signal obtained from a p-polarized light type magneto-optical disk in cases where the ½ wave length plate is located at the first rotating position $Q_1$ and the second rotating position $Q_2$.
FIG. 6B shows a waveform view representing different output levels of a tracking error signal obtained from a s-polarized light type magneto-optical disk in cases where the ½ wave length plate is located at the first rotating position $Q_1$ and the second rotating position $Q_2$.

A description will now be given of the operation of the magneto-optical disk storage 60. First, the disk 2 is experimentally reproduced. If the disk 2 is the p-polarized light type, the tracking error signal having the output level $V_{10}$, as shown in FIG. 6A, is initially obtained. Then, when the experimental reproducing signal 70 is supplied to the motor driving circuit 52 and thus the ½ wavelength plate 41 is rotated to the second rotating position $Q_2$, the tracking error signal having the output level $V_{11}$ is obtained. The memory 71 memorizes the output levels $V_{10}$ and $V_{11}$.

On the other hand, if the disk 2 is the s-polarized light type, the tracking signal having the output level $V_{20}$, as shown in FIG. 6B, is initially obtained. Then, when the experimental reproducing signal 70 is supplied to the motor driving circuit 52 and thus the ½ wavelength plate 41 is rotated to the second rotating position $Q_2$, the tracking error signal having the output level $V_{21}$ is obtained. The memory 71 memorizes the output levels $V_{20}$ and $V_{21}$.

The controller 72 instructs the memory 71 to output the output levels $V_{10}$ and $V_{11}$ or the output levels $V_{20}$ and $V_{21}$ to the comparator 73. Thus, whether the disk 2 is the p-polarized light type or the s-polarized light type can be judged. The angle of the polarized light surface is adjusted by the motor driving circuit 52 so that the tracking error signal having a higher output level can be obtained. After the experimental reproducing of the disk 2, the information recorded on the disk 2 is reproduced.

Incidentally, means for moving/removing the ½ wavelength plate 41 located at the second rotating position $Q_2$ on/from the optical path 43, rather than moving the ½ wavelength plate between the first and second rotating positions $Q_1$ and $Q_2$ may be used.

Further, the present invention is not limited to these preferred embodiments, but various variations and modifications may be made without departing from the scope of the present invention.

What is claimed is:

1. An optical head comprising:
laser means for radiating a laser beam, including polarizing means polarizing the beam, said laser means radiating the laser beam with a predetermined angle of a polarized light surface on a desired groove on a magneto-optical disk with a plurality of grooves thereon;
first detecting means for detecting a Kerr rotating angle of the laser beam at the desired groove;
reproducing means for reproducing information recorded on the magneto-optical disk based on the Kerr rotating angle detected by said first detecting means;
second detecting means for detecting a reflecting beam of the laser beam as a tracking error signal at the magneto-optical disk in order to transmit the laser beam onto the desired groove; and
angle changing means, coupled to said second detecting means, for changing the angle of the polarized light surface of the laser beam by controlling said polarizing means so that the strength of the tracking error signal detected by said second detecting means can be maximized.

2. An optical head according to claim 1, wherein said angle changing means alternatively changes the angle of the polarized light surface of the laser beam by 0° and 90°.

3. An optical head according to claim 1, wherein said laser means comprises a ½ wavelength plate which rotates the polarized light surface of the laser beam by 45°, and said angle changing means rotates the ½ wavelength plate.

4. An optical head according to claim 1, wherein said laser means comprises a cylindrical ½ wavelength plate which rotates the polarized light surface of the laser beam by 45°, and wherein said angle changing means comprises:
- a first gear, coupled to the ½ wavelength plate and located outside the circumference of the ½ wavelength, which gear has a hollow cylindrical shape;
- a second gear engageable with the first gear;
- a stepping motor which rotates the second gear; and
- a motor driving circuit which drives the stepping motor in accordance with the level of the tracking error signal.

5. A magneto-optical disk storage comprising:
an optical head comprising;
laser means for radiating a laser beam, including polarizing means polarizing the laser beam, said laser means radiating the laser beam with a predetermined angle of a polarized light surface on a desired groove on a magneto-optical disk with a plurality of grooves thereon,
first detecting means for detecting a Kerr rotating angle of the laser beam at the desired groove,
reproducing means for reproducing information recorded on the magneto-optical disk based on the Kerr rotating angle detected by said first detecting means,
second detecting means for detecting a reflecting beam of the laser beam as a tracking error signal at the magneto-optical disk in order to transmit the laser beam onto the desired groove, and
angle changing means, coupled to said second detecting means, for changing the angle of the polarized light surface of the laser beam by controlling said polarizing means so that the strength of the tracking error signal detected by said second detecting means can be maximized;
driving means for driving said optical head; and
control means for controlling the operation of said optical head.

6. A magneto-optical disk storage according to claim 5, wherein said magneto-optical disk storage further comprises magnet applying means for applying a magnetic field to the magneto-optical disk in order to record information thereon.

* * * * *

UNITED STATES PATENT AND TRADEMARK OFFICE
CERTIFICATE OF CORRECTION

PATENT NO. : 5,237,549
DATED : August 17, 1993
INVENTOR(S) : Shimozawa

It is certified that error appears in the above-indentified patent and that said Letters Patent is hereby corrected as shown below:

CLAIM 1, Col. 6, Line 44, after the word "the" insert ---laser---

Signed and Sealed this

Thirty-first Day of January, 1995

Attest:

BRUCE LEHMAN

*Attesting Officer*   *Commissioner of Patents and Trademarks*